Nov. 1, 1938.  M. HYNDMAN  2,135,306

DISPLAY DEVICE

Filed April 22, 1938

Inventor
Meade Hyndman
by Rippey & Cassidy
His Attorneys.

Patented Nov. 1, 1938

2,135,306

UNITED STATES PATENT OFFICE 2,135,306

DISPLAY DEVICE

Meade Hyndman, St. Louis, Mo.

Application April 22, 1938, Serial No. 203,483

5 Claims. (Cl. 40—4)

This invention relates to display devices; and has special reference to display devices made of pliable material and formed so that they may be easily placed upon supports therefor, even though the upper ends of the supports, such as bottles or the like, may include formations or flanges of larger diameter than subjacent portions.

An object of the invention is to provide an improved display device composed of flexible and pliable material, such as paper, having a conical portion adapted to enclose and seat upon a tapered portion of a support, and having laterally extended wall portions which, in cooperation with the intermediate arcuate portion of the device, provide a greater area for display of advertising or illustraitng matter, or other displays as desired. These lateral extensions or extended wall portions additionally function as handles to facilitate manual or mechanical placement of the display devices upon bottles or other supports in much more rapid succession than is possible to attain manually in placing known display devices upon milk bottles, etc.

Another object of the invention is to construct, arrange and assemble the display devices so that the ends of smaller diameter may expand and enlarge beyond the normal diameters thereof during the time that the enlarged ends of the supports are passing through the smaller or reduced ends of the display devices, without permanently distorting or damaging the display devices and irrespective of whether the ends of the pieces forming the display devices are securely attached together throughout the width thereof or not.

Another object of the invention is to provide an improved display device of the character mentioned made of a section of foldable and pliable material, such as paper or the like, having oppositely arranged extensions of double thickness of the material formed by folding one ply upon the other and permanently attaching the two plies together so that they will extend oppositely when the display device is placed upon a support.

Another object of the invention is to provide a blank of novel arrangement and construction for use in forming an improved display device.

Other objects will be apparent from the following description, reference being made to the annexed drawing, in which—

Figure 1:
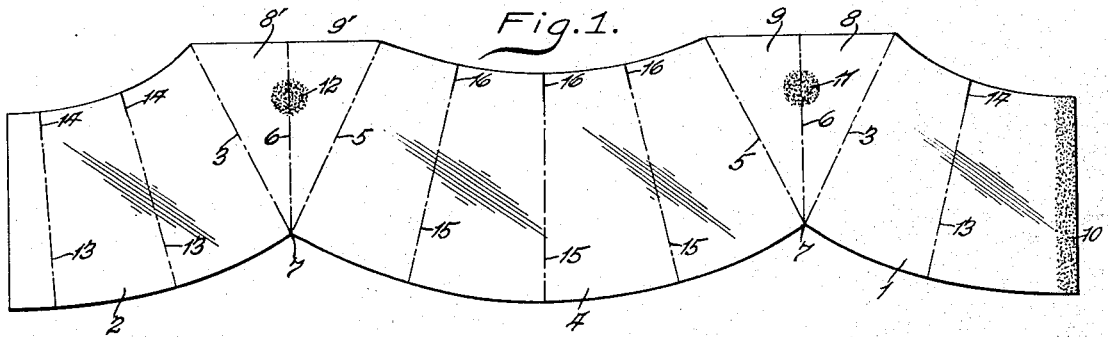
Fig. 1 is an inside plan view of one form of my improved blank from which the display device is formed.
Figure 2:
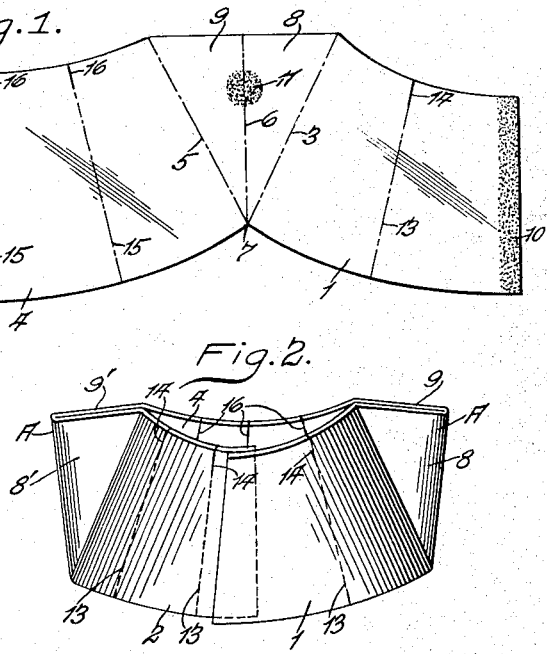
Fig. 2 is a perspective view of a display device made from the blank of Fig. 1, with a portion broken away.
Figure 3:
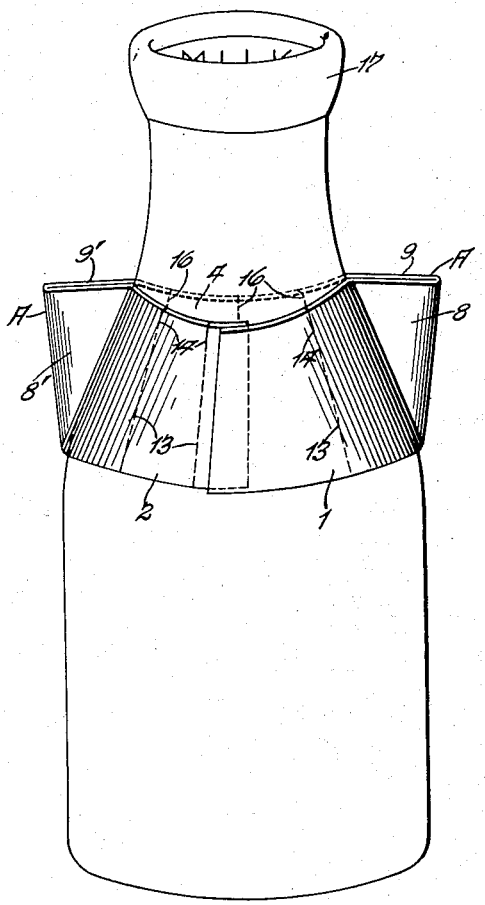
Fig. 3 is a perspective view of my improved display device mounted upon a support; in this instance, a conventional milk bottle.
Figure 4:
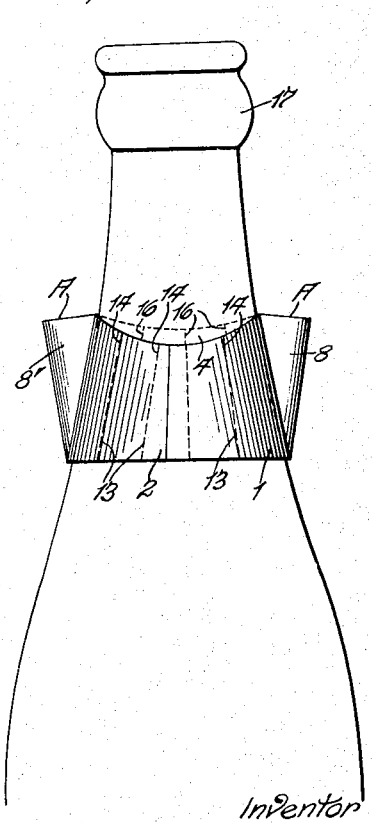
Fig. 4 is a perspective view of the display device mounted upon a support of different shape.

The blank shown in Fig. 1 includes arcuate end portions 1 and 2 terminating at approximately radial lines 3, which may be scores or not as desired; an arcuate intermediate portion 4 having a length preferably approximately equal to the effective length of the two end portions 1 and 2 after the end margins of said portions 1 and 2 have been overlapped and attached together, and the ends of which terminate at lines 5 approximately radial to the axis of one of the edges of the portion 4 and which may be scores or not as desired; and triangular portions integrally uniting the intermediate portion 4 with the end portions 1 and 2 between the lines 3 and 5, and each bisected by a fold line 6 extending from the apexes 7 of the triangular portions to the bases thereof, and dividing said triangular portions into the parts 8 and 9 and 8' and 9', respectively.

From this blank the display device is formed by folding the end portion 2 and the part 8' along the line 6 to superimpose the part 8' upon the part 9' and the end portion 2 upon the intermediate portion 4, and then folding the part 1 and the attached part 8 along the line 6 to superimpose said attached part 8 upon the part 9, the end portion 1 upon the intermediate portion 4, and overlap the margin of the portion 1 upon the adjacent margin of the portion 2. The margins of the end portions 1 and 2 may be attached by any appropriate attaching means, such as an adhesive 10, or otherwise as desired. Thus, the length of that portion of the device formed by the attached end portions 1 and 2 is approximately equal to the length of the intermediate portion 4, the parts 8 and 9 and 8' and 9' for the moment being disregarded.

Any desired area of the part 8 is attached to a corresponding area of the part 9 by any desired attaching means. For purpose of illustration, I have shown a quantity of adhesive 11 upon the adjacent surfaces of the parts 8 and 9 so that, when they are folded to superimposed relationship as explained, they will be adhesively united. As indicated, the whole or only a portion of the areas of the parts 8 and 9 may be attached together. As shown, only a portion of the surfaces of said parts will be attached together because the attaching means does not function to hold the line 3 fixed with respect to the line 5 throughout the length of said lines. Similarly, the parts 8' and 9' are attached together by attaching means 12, and, preferably, over areas approximately equal to the attached areas of the parts 8 and 9.

If desired, radial score lines 13 may be formed across the end portions 1 and 2 and may terminate in cuts or slits 14 which, when the device is made up, will be at the upper end thereof. Also, an equal or different number of radial score lines 15 may be formed across the intermediate portion 4 and terminate in radial cuts or slits 16 which also will be at the upper end of the device when completed.

When the device is completed in the manner described, the opposite side portions thereof lie flatwise against each other. Any advertising or illustrating matter or other displays may be imprinted upon the exposed surfaces of the device after it is completed, or upon the blank before the blank is folded into completed form. This advertising or display matter may be on the exposed surfaces of the parts 1, 2 and 4, as well as upon the exposed surfaces of the parts 8 and 8' and 9 and 9'. These respective parts, when attached together, constitute extensions or handles A which are approximately diametrically opposite and function not only as display surfaces and manually engageable handles for placing and removing the devices, but also as extensions which may be engaged by mechanical means to press the display devices to position on the supports, even though the flanges 17 at the upper ends of the supports may be of diameters considerably in excess of the diameters of the smaller ends of the display devices to be applied thereto. This is because the slots 14 and 16 will permit the reduced ends of the truncated conical display devices to enlarge or expand, as do the attachments between the parts 8 and 9 and the parts 8' and 9'. However, the slits 14 and 16 are not essential and may be omitted whenever desired; and, as explained, any desired areas of the parts 8 and 9 and the parts 8' and 9' may be attached together, and the invention is not restricted in that particular.

The invention may be varied in other particulars and those specifically mentioned. It must now be apparent that my improved display device attains all of its intended objects and purposes efficiently and satisfactorily and is designed particularly to provide better and larger display surfaces than display devices for similar purposes now in general use. Furthermore, the extensions or handles A greatly facilitate and expedite the application of the devices to supports either manually or mechanically, and they also facilitate removal of the devices from the supports whenever it is desired to remove them without damage thereto.

I do not restrict myself to the particular form of the device nor to the use of all of the features thereof specifically shown, but contemplate such variations in this regard and others as may be found desirable to adapt the device for its varied intended uses.

I claim:

1. A display device comprising a flat section of flexible and pliable material including an arcuate intermediate portion extending approximately one-half the length of said section, two arcuate end portions extending angularly from the ends of said intermediate portion and forming angles therewith at the outer edge of said intermediate portion, and triangular portions uniting said intermediate and end portions respectively; means attaching together the ends of said end sections, and means attaching together opposite parts of said triangular portions and holding them in double ply relationship, thereby holding the device in tapered form having said triangular portions extending outwardly therefrom.

2. A display device adapted to be placed upon a tapered support comprising an elongated strip of flexible material having two transverse fold lines intermediate of its ends, said strip being folded transversely along both of said fold lines and having its ends overlapping and attached together, and means permanently attaching together the two adjacent portions of said strip adjacent to said fold lines in a relationship in which a frusto-conical display device is formed in conformity with the shape of said tapered support when said tapered support is extended between the opposite portions of said device.

3. A display device adapted to be placed upon a tapered support comprising an elongated strip of flexible material folded transversely along two spaced lines and forming double portions adjacent to said lines, said strip having its ends overlapping and attached together between said doubled portions, and means attaching together the respective double portions of said strip and holding said strip in a relationship to form a frusto-conical display device when said support is extended between the opposite sides of said strip.

4. A display device adapted to be placed upon a tapered support comprising an elongated strip of flexible material folded transversely in two places intermediate of its ends and forming two spaced approximately triangular portions, each including two plies, means attaching together the ends of said strip, and means attaching together the two plies of each triangular portion in a relationship to form two laterally extended oppositely disposed extensions when the device is placed upon said tapered support.

5. A display device adapted to be placed upon a tapered support comprising an elongated strip of flexible material having upper and lower edges, said strip being folded transversely along two spaced lines and having its ends overlapping, means attaching together the overlapping ends of said strip, and means between the upper and lower edges of said strip attaching together the folded portions of said strip in a relationship in which the device conforms to said tapered support when the device is mounted thereon and said attached portions extend laterally outwardly from said support.

MEADE HYNDMAN.